(No Model.)
R. E. BOSCHERT.
POWER PRESS.
No. 300,201. Patented June 10, 1884.
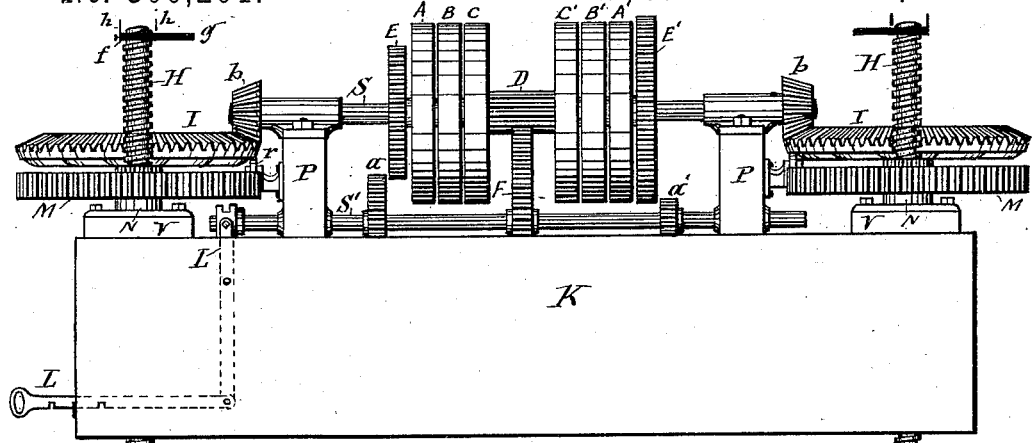
FIG-I-
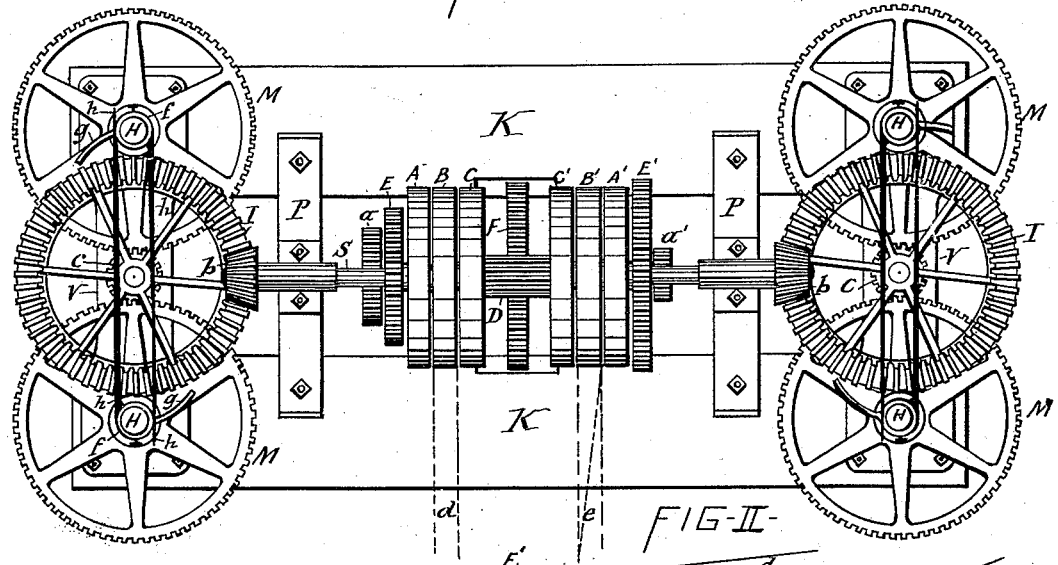
FIG-II-
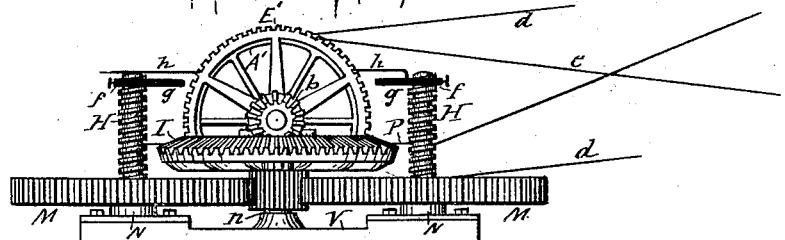
FIG-III-
WITNESSES
C. Bendixon
Wm C. Raymond
INVENTOR
Rufus E. Boschert
per Duell, Laass & Hey
his attys

UNITED STATES PATENT OFFICE.

RUFUS E. BOSCHERT, OF SYRACUSE, NEW YORK.

POWER-PRESS.

SPECIFICATION forming part of Letters Patent No. 300,201, dated June 10, 1884.

Application filed April 23, 1884. (No model.)

*To all whom it may concern:*

Be it known that I, RUFUS E. BOSCHERT, of Syracuse, in the county of Onondaga, in the State of New York, have invented new and useful Improvements in Power-Presses, of which the following, taken in connection with the accompanying drawings, is a full, clear, and exact description.

This invention consists in novel, simple, effective, and convenient devices for transmitting rotary motion at various velocities and in different directions to a shaft designed to work the nuts of the screws of a power-press, or for other purposes, all as hereinafter more fully described, and specifically set forth in the claims.

In the accompanying drawings, Figure I is a front view of the upper portion of a power-press provided with my improvements. Fig. II is a plan view, and Fig. III an end view, of the same.

Similar letters of reference indicate corresponding parts.

K represents the head-block of a power-press.

H H designate the power-screws, arranged in pairs at opposite ends of the press, and N are the nuts of the said screws, which nuts have integral with them spur-wheels M. Between the spur-wheels at each end of the press is a pinion, $c$, journaled on a gudgeon, $n$, which is fixed to a cross-plate, V, secured to the head-block K, and to the pinion $c$ is rigidly attached a bevel-gear, I. Longitudinally across the top of the press is extended the driving-shaft S, journaled in suitable bearings on blocks P P on top of the head-block, and having fixed to its opposite ends beveled pinions $b\, b$, meshing in the beveled gears I I.

D denotes an axially-elongated pinion mounted loose on the shaft S, and having affixed to its two ends two pulleys, C and C'.

B and B' are two pulleys mounted loose on the shaft S by the side of the pulleys C and C', and A and A' are two pulleys fastened to the aforesaid shaft contiguous to the outer side of the pulleys B and B'.

E and E' represent gears of different diameters fastened on the shaft S, and $r$ designates rollers arranged to support the bevel-gear I directly under the pinion $b$. Underneath the aforesaid driving-shaft and parallel therewith is a counter-shaft, S', journaled in bearings secured to the base of the blocks P P, before mentioned. Said counter-shaft is adapted to slide longitudinally in its bearings, and has connected with it a lever, L, by which to shift it. To the central portion of the counter-shaft is rigidly attached a gear, F, which meshes in the elongated pinion D of the driving-shaft S, the elongation of the pinion maintaining it in constant engagement with the aforesaid gear during the shifting of the counter-shaft.

$a$ and $a'$ are two gears of different diameters, fastened to the counter-shaft in such positions in relation to the gears E and E' as to allow the shifting of the counter-shaft to either carry both of its gears $a\ a'$ clear of the gears E E', or throw one of the former at a time into engagement with one of the latter adjacent thereto.

The operation of the described mechanism is as follows: Two driving-belts, $d$ and $e$, running in opposite directions, and each of the requisite width to drive one of the pulleys of the shaft S, are extended, respectively, around the two sets of pulleys of said shaft. When said belts are on the loose pulleys B and B', the shaft S is at rest. By shifting the belt $e$ onto the loose pulley B' and the belt $d$ onto the fast pulley A the shaft S is rotated in one direction, and by shifting the belt $d$ onto the loose pulley B and the other belt, $e$, onto the fast pulley A' the shaft receives a reverse rotation at the same velocity as its before-stated movement. The screws H H are thus run up and down at the same velocity. The gears $a$ and $a'$ of the counter-shaft are in the meantime kept out of engagement with the gears E and E'. When it is desired to run the screws H H up with reduced speed, the belt $e$ is run onto the loose pulley B', the belt $d$ onto the pulley C, and the counter-shaft S' shifted to carry its gear $a$ into engagement with the gear E. The pulley C, being attached to the loosely-mounted pinion D, is allowed to rotate independently of the shaft S and transmits motion to the counter-shaft S' by the gear F, which is fixed to the latter shaft. Said gear, having a much greater diameter than the pinion D, causes the counter-shaft to receive a correspondingly-reduced speed of motion, and the motion of the shaft S is still further reduced by the gear $a$ being smaller than the gear E. If it is desired to work the screws H H still slower, it is only necessary to shift the counter-shaft S' so as to throw the gear a' into engagement with the gear E'. The difference in the diameters of said gears is much greater than that of the gears a and E, and consequently the speed of the driving-shaft S is diminished accordingly. The reverse movement of the screws can be differentiated in the same manner after the belt d has been thrown onto the loose pulley B and the belt e onto the pulley C'. It will thus be observed that the speed and direction of the driving-shaft are brought under perfect control of the attendant of the machine by very simple, convenient, compact, and effective means.

It is obvious that the same result can be accomplished by confining the counter-shaft longitudinally and mounting its gears loose thereon, with a spline-and-groove connection, which allows the gears to be shifted in and out of engagement with the gears of the driving-shaft; hence I do not limit my invention specifically to the hereinbefore-described arrangement of the counter-shaft.

On the screws H H are clamped collars f f, each having extended horizontally from it a quadrant, g, and an indicator, h, reaching to or across the quadrant of the collar on the other screw H. Any twist or torsion produced on the screw will be readily detected by the resultant movement of the free end of the long indicator h. These torsion-indicating devices constitute the subject-matter of another application for Letters Patent which I am about to file.

Having described my invention, what I claim as new, and desire to secure by Letters Patent, is—

1. The combination, with a driving-shaft, of a gear fastened on said shaft, and a pinion and pulley fastened to each other and mounted loose on the shaft, and a counter-shaft having fastened to it a gear engaging the loose pinion of the driving-shaft, and a gear adapted to be thrown in and out of engagement with the fast gear of the driving-shaft, substantially as set forth.

2. The combination, with a driving-shaft, of gears of different diameters fastened on said shaft, a pulley and pinion fastened to each other and mounted loose on the driving-shaft, and a counter shaft having fastened to it a gear in constant engagement with the loose pinion of the driving-shaft, and gears adapted to be thrown in and out of engagement with the fast gears of the driving-shaft, substantially as set forth.

3. The combination, with a driving-shaft, of gears of different diameters fastened to said shaft, a driving-pulley and an axially-elongated gear fastened to each other and loose on the driving-shaft, a counter-shaft adapted to be shifted longitudinally, and having fastened to it a gear in constant engagement with the loose elongated gear of the driving-shaft, and two gears adapted to be carried in and out of engagement alternately with the two fast gears of the driving-shaft by the shifting of the counter-shaft, substantially as described and shown.

4. In combination with the two driving-belts d and e, running in opposite directions, the shaft S, having mounted thereon the loose elongated pinion D, pulleys C C', fixed to said pinion, loose pulleys B B', fast pulleys A A', and fast gears E E', the counter-shaft S', having the fast gear F in constant engagement with the pinion D, and fast gears a a', adapted to be thrown in and out of engagement alternately with the two gears E and E', substantially as set forth and shown.

5. In combination with the power-screws H H and nuts N N, the spur-wheels M M, integral with said nuts, the intermediate pinion, c, bevel-gear I, the shaft S, provided with bevel-pinions b, elongated loose pinion D, pulleys C C', fixed to the loose pinion D, loose pulleys B B', fast pulleys A A', and fast differential gears E E', belts d and e, running in opposite directions, counter-shaft S, adapted to slide longitudinally, gears F, a, and a', fixed to the counter-shaft, and the shifting-lever L, connected with the counter-shaft, all combined to operate substantially as specified and shown.

In testimony whereof I have hereunto signed my name and affixed my seal, in the presence of two attesting witnesses, at Syracuse, in the county of Onondaga, in the State of New York, this 28th day of March, 1884.

RUFUS E. BOSCHERT. [L. S.]

Witnesses:
 F. H. GIBBS,
 C. BENDIXON.